(12) United States Patent
Brossier et al.

(10) Patent No.: US 7,341,380 B2
(45) Date of Patent: Mar. 11, 2008

(54) INSTALLATION LAYOUT FOR TWO COAXIAL SHAFT LINES

(75) Inventors: Pascal Brossier, Saint Martin en Biere (FR); Carmen Miraucourt, Brie Comte-Robert (FR)

(73) Assignee: SNECMA Moteurs, Paris (FR)

( * ) Notice: Subject to any disclaimer, the term of this patent is extended or adjusted under 35 U.S.C. 154(b) by 267 days.

(21) Appl. No.: 11/183,767

(22) Filed: Jul. 19, 2005

(65) Prior Publication Data

US 2005/0249443 A1      Nov. 10, 2005

Related U.S. Application Data

(63) Continuation of application No. 10/476,372, filed as application No. PCT/FR02/01506 on May 2, 2002, now abandoned.

(30) Foreign Application Priority Data

May 3, 2001    (FR) .................................. 01 05900

(51) Int. Cl.
   *F16C 33/72*    (2006.01)
   *F03B 11/06*    (2006.01)
(52) U.S. Cl. ...................... 384/537; 415/229
(58) Field of Classification Search ................ 384/519, 384/517, 535, 537, 558; 415/124.1, 170.1, 415/229, 230
See application file for complete search history.

(56) References Cited

U.S. PATENT DOCUMENTS 2,932,443 A    4/1960  Gunberg et al.
4,201,426 A    5/1980  Brozenske et al.
4,973,221 A *  11/1990  Anderson et al. ........... 415/119
5,201,844 A    4/1993  Greenwood et al.
6,338,578 B1 * 1/2002  Adde et al. .................. 384/537
7,128,529 B2 * 10/2006 Le Jeune et al. ........... 415/229

FOREIGN PATENT DOCUMENTS

| EP | 0 359 659 | 3/1990 |
| EP | 0 987 457 | 3/2000 |
| FR | 935 401   | 6/1948 |
| FR | 2 494 342 | 5/1982 |
| GB | 1 085 619 | 10/1967 |
| GB | 1 130 279 | 10/1968 |

* cited by examiner

*Primary Examiner*—Thomas R. Hannon
(74) *Attorney, Agent, or Firm*—Oblon, Spivak, McClelland, Maier & Neustadt, P.C.

(57) ABSTRACT

In an assembly with two concentric shafts, the internal shaft projecting beyond the external shaft, a seal support sleeve placed between the shafts has a conical shape and bears on a spacer mounted on the external shaft between an assembly nut of the forward end of the external shaft and a bearing, so that the nut is accessible to be unscrewed through the space between the two shafts, thus enabling the external shaft to be disassembled. The invention may be applicable to front bearings of gas turbine high pressure shafts and makes it possible to disassemble the high pressure body from the rear, without needing to disassemble equipment, such as a fan on the front of the machine, or hindering the installation of a gear.

5 Claims, 4 Drawing Sheets

INSTALLATION LAYOUT FOR TWO COAXIAL SHAFT LINES

CROSS-REFERENCE TO RELATED APPLICATIONS

This document is a continuation of U.S. application Ser. No. 10/476,372, filed Mar. 24, 2004 now abandoned, which is a National Stage of PCT Application No. PCT/FR02/01506, filed on May 2, 2002. This application is also based upon and claims the benefit of priority from the prior French Patent Application No. 01/05900, filed May 3, 2001. The contents of U.S. application Ser. No. 10/476,372 are incorporated herein by reference in their entirety.

BACKGROUND OF THE INVENTION

1. Field of the Invention

This invention relates to an assembly for the installation of two coaxial shafts, particularly a so-called low pressure shaft as shown in FIG. 1, connecting the low pressure compressor 1 to the low pressure turbine 2 in a gas turbine, surrounded by a high pressure shaft connecting the high pressure compressor 3 to the high pressure turbine 4. Throughout this specification, the front part of the machine is at the left-hand part of the drawings and the rear part of the machine is at the right-hand part.

2. Description of Related Art

In this type of machine, the internal shaft 15 (low pressure) projects beyond the front of the external shaft 16 (high pressure) and can finish at a shaft end 5 supporting a large volume fan 6 on which large radius blades are fitted to discharge air into an auxiliary stream 7 surrounding the main gas stream 8. If there is an accidental breakage in this fan, there will be a severe out-of-balance mass on the internal shaft 15. Thus, some arrangements need to be made. Firstly, a bearing 9, also referred to as the number 1 bearing, right at the front of the internal shaft 15, may be made fusible or breakable; in other words, it may be installed on a low resistance support 10 that is designed to break as soon as an out-of-balance mass develops, so that the resulting large forces that are then generated are not transmitted to the rest of the stator structure. The shaft end 5 is then free to tilt by moving under the effect of the out-of-balance mass until the assembly that it forms with the fan 6 moves into a new equilibrium position in rotation, without necessarily causing any further damage until the machine stops. The shaft end 5 tilts around another bearing 17, also referred to as bearing number 2, behind the previous bearing 9, that supports the back end of the shaft end 5 and a main portion of the internal shaft 15. This bearing 17 controls the axial position of the internal shaft 15.

A take-off gear 20, designed particularly to start the machine and activated by a transmission shaft 25 perpendicular to the shafts 15 and 16, must be placed between this bearing 17 and still another bearing 18, also referred to as bearing number 3, that provides support to the forward end of the external shaft 16. The bearing 17, being as far backwards as possible to improve the dynamic resistance of the internal shaft 15, is only separated from the bearing 18 by just sufficient space to contain the take-off gear 20. An assembly nut is screwed around the forward end of the external shaft 16, abutting against the bearing 18 to stop axial movement. This nut (shown in FIG. 2), which extends forwards from the bearing 18 and is disposed just above the take-off gear 20, is difficult to access, particularly because a seal support sleeve must be placed behind the bearing 17 immediately in front of the nut. The sleeve overlaps the forward end of the external shaft 16 and a portion of the internal shaft 15 to create a seal between them. Disassembly of the high pressure shaft 16 for maintenance is usually only possible after disassembling the machine in front of the nut, and particularly removing the fan 6, so that the nut can be reached and unscrewed.

French patent 2 783 579 describes an assembly by which the nut can be unscrewed from behind by using a special tool inserted into the annular space between the shafts. This is more convenient despite the fact that this space is narrow, since there is then no need for any major disassembly of elements of the machine for removing the high pressure shaft, but in that patent the nut is screwed inside the external shaft whereas it is screwed around the shaft in more conventional designs, which changes the entire design of the forward end of the shaft and can introduce other disadvantages. In the present invention, another solution is proposed to provide easy access from the rear part of the machine to the nut retaining the external shaft 16 without making any major change to the design. A few modifications to parts of the machine surrounding the nut remain necessary, but it will be seen that they are mainly concerned with sealing and take-off devices, for which the design may be altered more easily.

BRIEF SUMMARY OF THE INVENTION

In its most general form, the representative assembly of the invention comprises coaxial internal and external shafts, a forward part of the internal shaft projecting beyond a forward end of the external shaft, a sleeve surrounding the shafts and supporting a seal associated with each of the shafts, a bearing supporting the external shaft close to the forward end and a bearing retaining nut screwed around the forward end, a spacer with an adjustment part slid around the external shaft and tightened between the nut and the bearing, and a sealing part on which the seal associated with the external shaft rubs, the sealing part being arranged around the nut.

BRIEF DESCRIPTION OF THE DRAWINGS

The advantages and other aspects of the invention will be discovered after reading the commentary on the following figures.

DETAILED DESCRIPTION OF THE INVENTION

Figure 1:
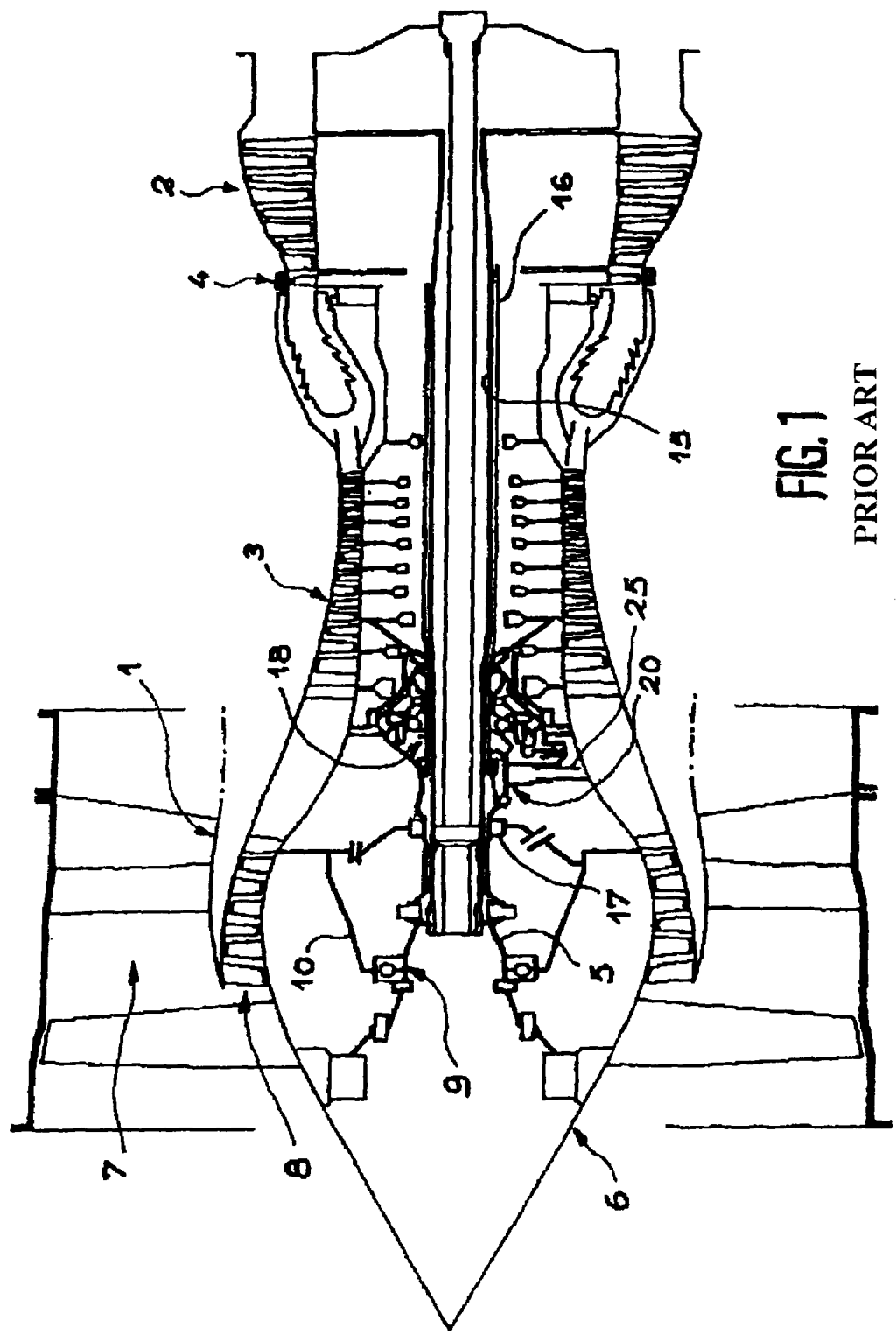
FIG. 1, already described, is an overview of a gas turbine.
Figure 2:
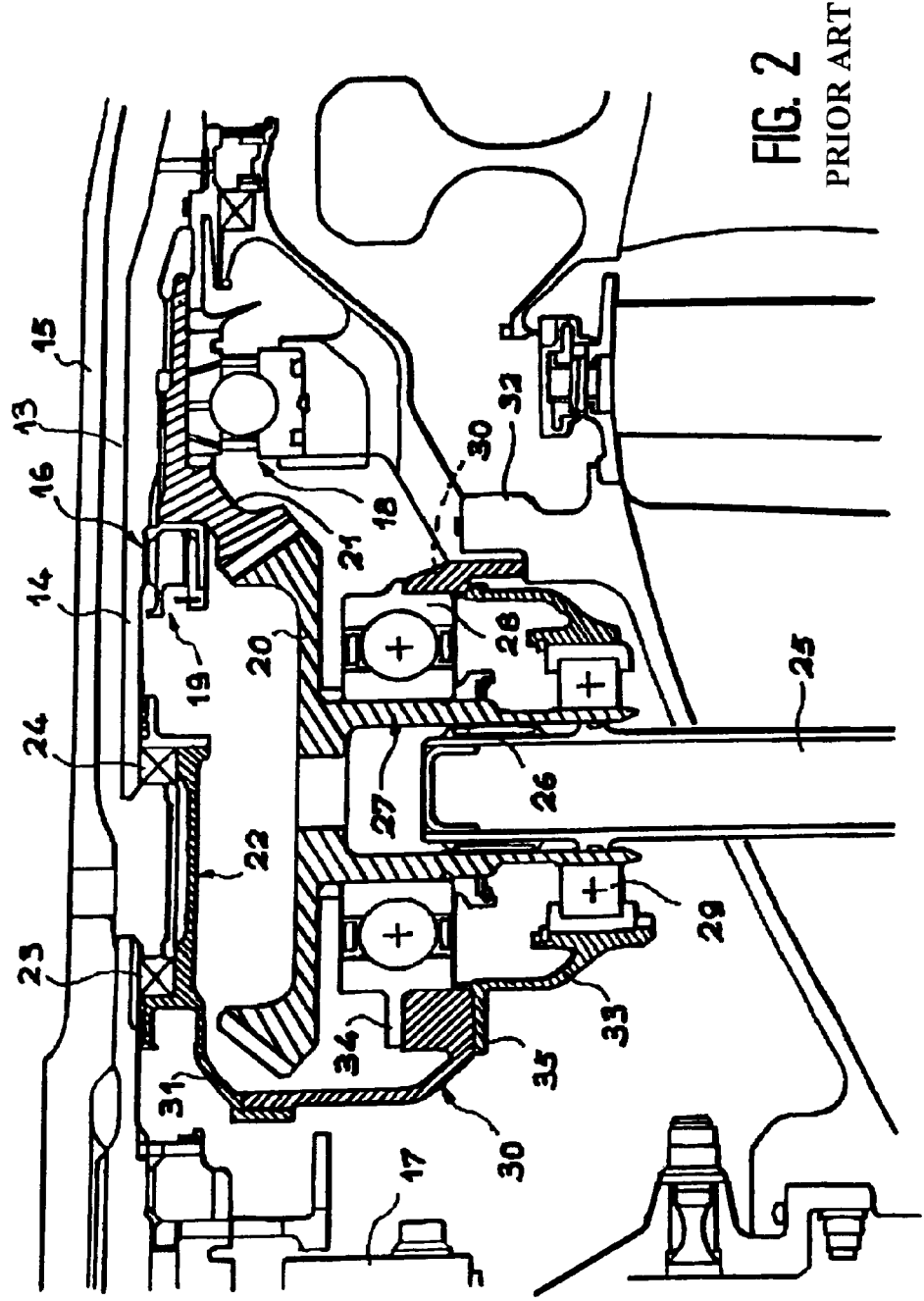
FIG. 2 shows a conventional assembly in which the problems of access to the nut mentioned above were not solved.

FIG. 2 shows a portion of the internal shaft 15, the forward end of the external a shaft 16, one end of the (number 2) bearing 17, the (number 3) bearing 18, the assembly nut 19 of bearing 18, the take-off gear 20, a crown wheel 21 engaged with the take-off gear 20 and retained around the external shaft 16 and between the nut 19 and the bearing 18, the seal support sleeve 22, and its two seals 23 and 24 rubbing on contiguous portions of shafts 15 and 16.

The environment of the take-off gear 20 comprises: a transmission shaft 25 connected in rotation to the take-off gear 20 by splines 26 and engaged in a hub 27 of the take-off gear 20; a pair of bearings 28 and 29 engaged around the hub 27; a housing 30 screwed to an extension 31 of the sleeve 22, that connects (at the right in the figure) to a casing 32 of the stator; a shell 33 screwed to the housing 30 and in which the bearing 29 remote from take-off gear 20 is retained while the bearing 28 closer to the take-off gear 20 is retained on the hub 27 and slides in the housing 30; collars 34 and 35 of the bearing 28 and the shell 33 containing the housing 30 are screwed to it to keep the bearings 28 and 29 in a fixed position along the hub 27. The attachment screws are not shown to simplify the drawing. In this case, the bearing 28 is a ball bearing and bearing 29 is a roller bearing, without an internal race and in which the rollers bear directly on the hub 27.

It is worthwhile mentioning the method of fitting this assembly onto the take-off gear 20 after the nut 19 has been screwed around the external shaft 16. The take-off gear 20, the bearing 28 closer to it, and the housing 30 are installed by fixing the housing 30 onto the casing 32, the shell 33 and the bearing 29 are then installed by fixing the shell to the housing 30 and the seal support sleeve 22 is fixed to the housing 30 by sliding it backward. Finally the transmission shaft 25 is inserted in the hub 27. It is seen that the nut 19, well surrounded by other parts, has become inaccessible unless major disassembly operations are carried out. Since the seal 24 rubs on a lip 14 of the external shaft 16 that extends forwards from the nut 19 and the nut 19 is screwed around the external shaft 16, the seal support sleeve 22 completely separates the nut 19 from the annular space 13 between the shafts 15 and 16 through which the nut 19 could be unscrewed from the rear of the machine with the dedicated conventional tool comprising claws.

Figure 3:
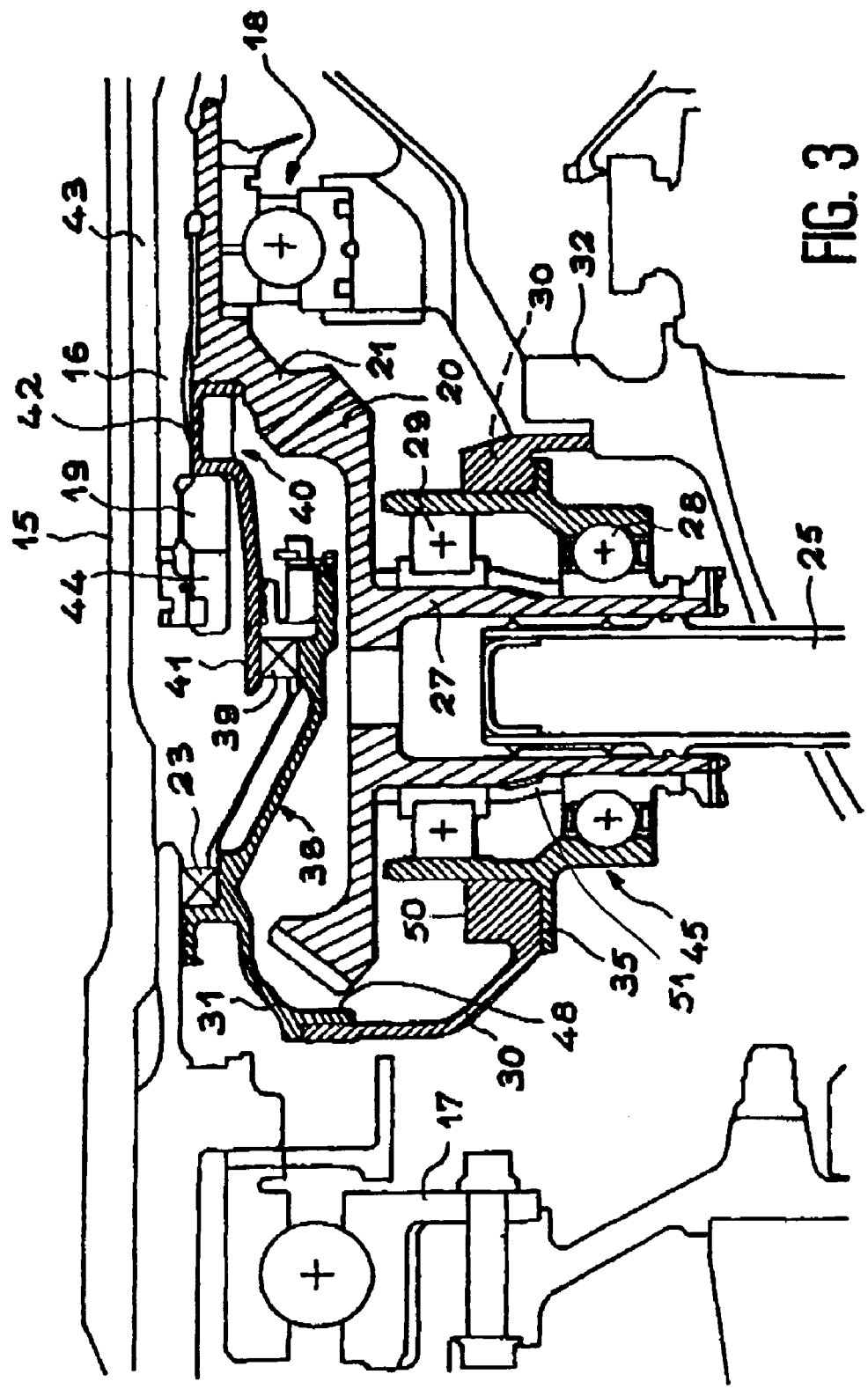
FIG. 3 shows an assembly conforming with the invention.

FIG. 3 illustrates a first embodiment of the invention. The description will be made by comparison to FIG. 2, only the alterations therefrom being indicated. FIG. 3 firstly shows a modified seal support sleeve is identified as element 38 having a conical shape and the seal, now identified as element 39, of the external shaft 16 now having a larger diameter than the (unchanged) seal 23 of the internal shaft 15; the seal 39 does not actually rub on the external shaft 16, but rather on a sealing contact surface 41 of a spacer 40 assembled to the external shaft 16 and provided with a thrust contact surface 42 adjusted around the external shaft 16 and compressed between the nut 19 and the crown wheel 21 by the former.

The result of this arrangement is that the sealing contact surface 41 and the sleeve 38 surround the nut 19 instead of extending forward therefrom, thus the nut 19 becomes accessible from the rear part of the machine. The dedicated tool can be slid in the annular space 43 between the shafts 15 and 16 to reach the nut 19 which is at the forward end of the shaft 16, the frontward lip 14 having been replaced by the surrounding sealing contact surface 41. For the sake of completeness, it has been shown a conventional locking part 44 of the nut 19 comprising crab teeth penetrating into the nut 19 and the external shaft 16 to prevent any relative rotation of the nut 19 and the external shaft 16 when it is installed; the locking part 44 is in the form of a split ring made of an elastic material so that it can be opened during assembly.

Some arrangements near the take-off gear 20 are implemented to adapt the design to the modified shape of the seal support sleeve 38. There are still the two bearings 28 and 29 for supporting the hub support 27 of the take-off gear 20 and the housing 30 fixed to the extension 31 of the seal support sleeve 38 and to the casing 32, but now the shell 33 is replaced by a different shell 45 that extends around the two bearings 28 and 29 and still comprises the collar 35 for attaching to the housing 30.

The assembly is different from the assembly in FIG. 2. After the housing 30 containing the take-off gear 20 fitted with the closer bearing (in this case the roller bearing 29) has been fixed, the take-off gear 20 lying on a bottom surface of the housing 30, the seal support sleeve 38 is slid backwardly above the gear 20 and fixed to the housing 30. The shell 45 fitted with the bearing remoter to the take-off gear 20 (in this case the ball bearing 28) is then inserted into the reaming in the housing 30 and around the hub 27 and the bearing 29. The bearing 28 supports a spacer ring 51 that finally touches the other bearing 29 during this movement, pushes it up and lifts the take-off gear 20. When the collar 35 stops in contact with the housing 30, the take-off gear 20 meshes with the crown wheel 21. The transmission shaft 25 is then finally installed.

Figure 4:
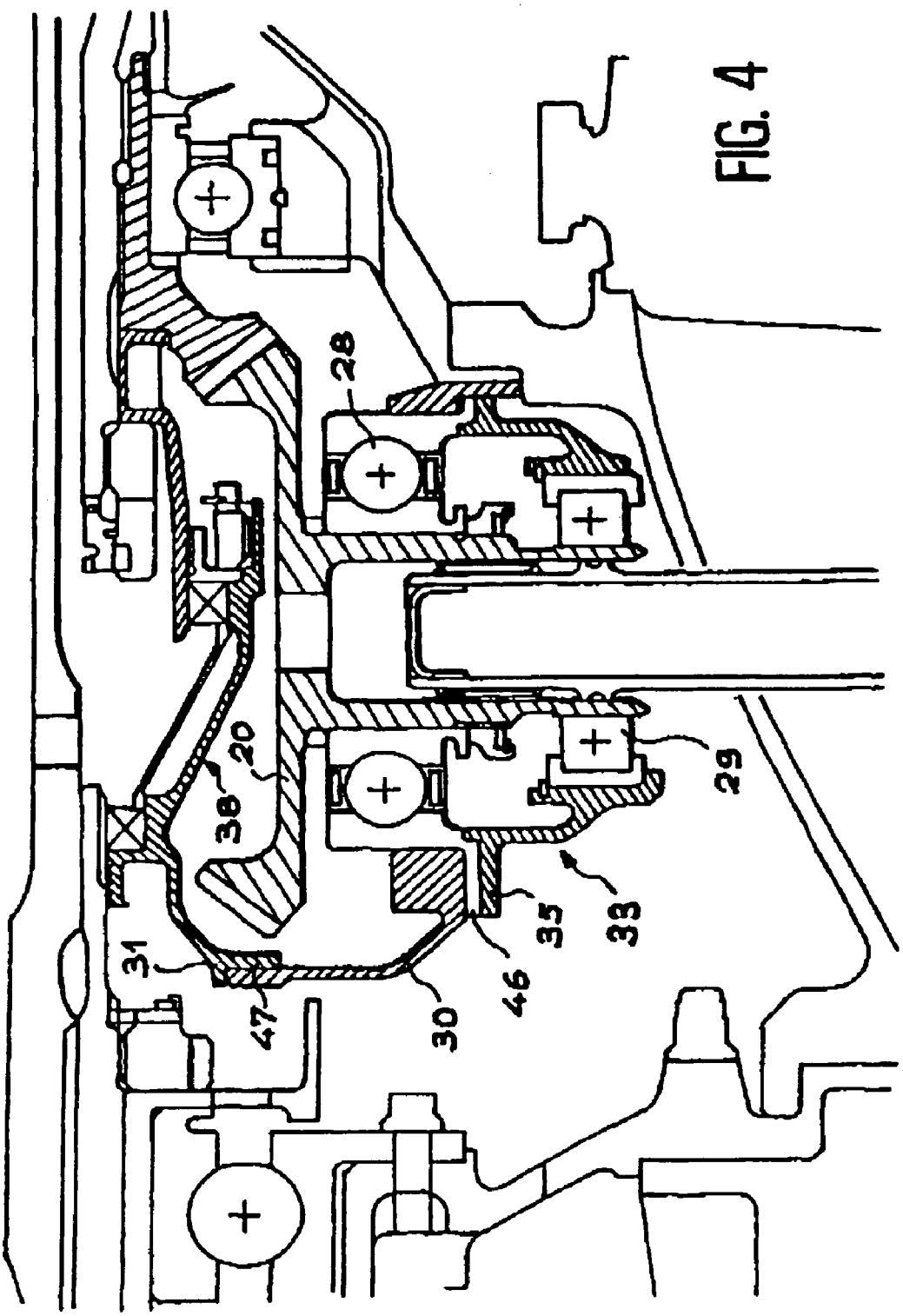
FIG. 4 shows a view of another assembly conforming with the invention.

FIG. 4 represents a variant in which bearings 28 and 29 occupy the same positions as in the FIG. 2 design and in which the shell 33 of FIG. 2 is used, but the collar 34 of the bearing 28 placed on a rim of the housing 30 is replaced by a collar 46 placed under the rim and the collar 35 of the shell 33 contacts the lower face of the collar 46. The assembly is made approximately in the same way as in FIG. 3, except that the bearings 28 and 29 are both installed after the take-off gear 20 has been put in the housing 30.

The innovation of the assembly according to the invention can be explained as follows. The access to the nut 19 from the front, which was the only possible way in conventional designs, required sliding the seal support sleeve 22 in FIG. 2 forward, separating it from the housing 30. This movement of the seal support sleeve in the forward direction is no longer useful with the invention, and it is even impossible since the flared rear part of the seal support sleeve 38 would interfere with the teeth of the take-off gear 20. Thus, it would also be a problem to assemble the housing 30 if the seal support sleeve 38 were moved forwards, since its raised front edge would be stopped in contact with the flared rear part of the housing. Therefore in the embodiment of FIG. 3 the seal support sleeve 38 is pulled backward during assembly of the housing 30 and the take-off gear 20; its attachment flange 48 stops in contact with the housing 30 at the back, unlike in FIG. 2. The assembly does not cause any difficulty provided that the take-off gear 20 can be lowered to the bottom of the housing 30 so that it does not collide with the attachment flange 48 or other parts of the seal support sleeve 38 before it is in its final position, which is possible if the shell 45 below the housing 30, assembled to the housing 30 with an ascending movement, supports both bearings 28 and 29 so that the take-off gear 20 may be lowered below the seal support sleeve 38 as soon as the shell 45 is disassembled.

The assembly in FIG. 3 with a single shell 45 for the bearing 28 providing the take-off gear 20 with thrust support and the bearing 29 sliding in the vertical direction, is simpler and probably more rigid, but it makes it necessary to invert the conventional positions of the bearings 28 and 29, and assembly can be more complicated due to the larger size of the shell 45. This is why the assembly in FIG. 4, in which the main difference from the prior art is the position of the collar 46, has merits.

The invention claimed is:

1. An assembly comprising:
   an internal shaft and an external shaft, said internal and external shafts being coaxial and a forward part of the internal shaft projecting beyond a forward end of the external shaft;
   a sleeve surrounding the shafts and holding first and second seals, the first seal sealing a portion of the internal shaft and the second seal sealing a portion of the external shaft;
   a first bearing supporting the forward end of the external shaft;
   a nut screwed around said forward end for providing a stop for said first bearing; and
   a spacer having a first part adjusted around the external shaft and retained between the nut and the first bearing, and a second part extending around the nut on which the second seal sealing with the external shaft rubs.

2. The assembly according to claim 1, further comprising:
   a gear arranged under the nut, the spacer and the sleeve in a direction substantially perpendicular to both shafts;
   a housing surrounding the gear; and
   a bearing shell carrying at least one bearing, said at least one bearing being installable around a hub of the gear for bearing the gear, wherein the bearing and the shell can be assembled together with an ascending displacement of the shell.

3. The assembly according to claim 2, wherein the seal support sleeve is assemblable to the housing after a forward displacement of the sleeve.

4. The assembly according to claim 1, wherein a diameter of the second seal is larger than a diameter of the first seal.

5. The assembly according to claim 1, wherein the sleeve is conical.

* * * * *